United States Patent [19]

Izutsu et al.

[11] Patent Number: 5,334,109

[45] Date of Patent: Aug. 2, 1994

[54] BELT TENSION ADJUSTING DEVICE

[75] Inventors: Tomoyoshi Izutsu; Kazuki Kawashima, both of Iwata, Japan

[73] Assignee: NTN Corporation, Osaka, Japan

[21] Appl. No.: 991,008

[22] Filed: Dec. 16, 1992

[30] Foreign Application Priority Data

Dec. 18, 1991 [JP] Japan ............... 3-104399[U]
Dec. 18, 1991 [JP] Japan ............... 3-104451[U]

[51] Int. Cl.⁵ .................................. F16H 7/08
[52] U.S. Cl. ........................................... 474/135
[58] Field of Search ........ 474/101, 109, 111, 113–117, 474/133–138

[56] References Cited

U.S. PATENT DOCUMENTS

| | | | |
|---|---|---|---|
| 4,813,915 | 3/1989 | Kotzab | 474/135 X |
| 4,971,589 | 11/1990 | Sidwell et al. | 474/135 |
| 4,983,145 | 1/1991 | Hirai et al. | 474/135 X |
| 5,083,984 | 1/1992 | Quintus et al. | 474/135 |

FOREIGN PATENT DOCUMENTS 0362619 4/1990 European Pat. Off. .
0509313 10/1992 European Pat. Off. .

*Primary Examiner*—Thuy M. Bui
*Attorney, Agent, or Firm*—Nikaido Marmelstein Murray & Oram

[57] ABSTRACT

A belt tension adjusting device having a fixed member, a support shaft extending vertically from the fixed member and a pulley arm having a boss formed with a boss. The support shaft is received in the bore to rotatably support the pulley arm. A damper mechanism is mounted between the support shaft and the boss for damping a pivoting motion of the pulley arm. A pulley is mounted on the pulley arm. A tension adjusting spring is coupled to the pulley arm for biasing the pulley to impart tension to a belt. A bearing is provided for receiving radial loads produced when the pulley arm pivots. Part of the bearing is located in part outside the boss.

2 Claims, 3 Drawing Sheets

BELT TENSION ADJUSTING DEVICE

This invention relates to a belt tension adjusting device for use with a belt for driving an auxiliary part of an engine.

Conventional belt tension adjusting devices have a damper mechanism built in a pulley arm to prevent the resonance of the pulley arm due to microscopic vibrations transmitted from the belt and thus to reduce the microscopic vibrations.

One of such belt tension adjusting devices is disclosed in Japanese Unexamined Utility Model Publication 2-138257.

The device proposed in this publication comprises, as shown in FIG. 5, a support shaft 32 extending from a fixed member 31, a pulley arm 34 rotatably mounted on the support shaft 32 through a bearing member 33, and a tension adjusting spring 35 provided around the pulley arm 34 and coupled to the pulley arm 34 and the fixed member 31.

A plurality of axial holes 36 are formed through the peripheral wall of the pulley arm 34 so as to surround the support shaft 32. A damper mechanism 37 comprising a coil spring 38 and a presser element 39 is mounted in each hole 36.

In this arrangement, a belt tensioning force is imparted to a pulley 40 mounted on the pulley arm 34 by the force of the tension adjusting spring 35, while damper effect for damping the pivoting motion of the pulley arm 34 is obtained by the frictional force produced between the presser elements 39 and the fixed member 31 due to the force of the coil springs 38.

In such a device, the bearing member 33 extends the entire length of the support shaft 32 and the radial load produced when the pulley arm 34 pivots is borne on the entire area of the bearing member 33. Since the bearing member 33 has the same length as the support shaft 32, it is rather costly. Also, the entire device tends to be tall. If one tries to reduce the length of the bearing member 33 in order to reduce the height of the entire device, its load-bearing capacity may drop. This will reduce the rigidity of the device.

Another problem with the above-proposed device is that since the bearing member 33 is provided between the support shaft 32 and the pulley arm 34 and the damper mechanisms 37 are mounted outside the bearing member 33, the peripheral wall of the pulley arm 34 has a rather large diameter and thus the outer dimensions of the entire device tend to be rather large.

In this arrangement, radial loads are borne on the bearing member 33 extending for the entire length of the support shaft 32. In adjustment of the tension of a belt for driving an auxiliary machine, the belt-engaging pulley 40 is mounted at a level higher than the support shaft 32. Because of this difference in height, the bearing member is subjected to a considerable bending moment. This bending moment does not act uniformly on the entire length of the bearing member 33 but tends to concentrate on both ends. As a result, the bearing member 33 will get worn more quickly at both ends. Thus, even if the central part of the bearing member 33 has not been worn very badly, it may sometimes have to be replaced. This is economically disadvantageous.

A first object of this invention is to provide a belt tension adjusting device which is low in height while maintaining a sufficiently large radial load-bearing capacity.

A second object of this invention is to provide a belt tension adjusting device which has small outer dimensions and which assures efficient operation of the bearing without sacrificing the load-bearing capacity of the bearing.

In order to achieve the first object, there is a belt tension adjusting device comprising a fixed member, a support shaft extending vertically from the fixed member, a pulley arm having a boss at one end thereof and a pulley mounted at the other end thereof, the boss being formed with a bore, the pulley arm pivotally mounted on the support shaft with the support shaft received in the bore, a damper mechanism mounted between the support shaft and the boss for damping the pivoting motion of the pulley arm, a tension adjusting spring coupled to the pulley arm for biasing the pulley to impart tension to a belt, and a bearing for bearing the radial load produced when the pulley arm pivots, at least part of the bearing being located on the outer periphery of the boss of the pulley arm.

In order to achieve the second object, there is provided a belt tension adjusting device comprising a fixed member, a support shaft extending vertically from the fixed member, a pulley arm having a boss at one end thereof and a pulley mounted at the other end thereof, the boss being formed with a bore, the pulley arm pivotally mounted on the support shaft with the support shaft received in the bore, a damper mechanism mounted between the support shaft and the boss for damping the pivoting motion of the pulley arm in one direction, a tension adjusting spring coupled to the pulley arm for biasing the pulley to impart tension to a belt, a pair of bearings provided independently of each other at both ends of the support shaft, the damper mechanism being provided between the bearings, one of the bearings which is located nearer to the point at which the pulley is mounted on the pulley arm having a length larger than the length of the other of the bearings.

In the first arrangement, the bearing provided outside the pulley arm at a portion where the bore is formed overlaps longitudinally with the support shaft. This makes it possible to reduce the height of the device without reducing the entire length of the bearing, i.e. without reducing the capacity to bear radial loads. The portion of the bearing located outside does not interfere with the damper mechanism, so that its length is not limited. Thus, the load-bearing capacity of the device can be improved, On the other hand, in the second arrangement, the radial load resulting from bending force which concentrates on both ends of the support shaft is borne by the bearings provided at both ends of the support shaft.

Also, with this arrangement, by mounting the damper mechanism in the center of the support shaft, the bearings and the damper mechanism are located around the support shaft. This makes it possible to reduce the outer dimensions of the pulley arm.

Further, the bearing located nearer to the pulley mounting position, which is subjected to greater bending moment, has a length larger than the length of the other bearing so that both bearings are subjected to substantially the same surface pressure. Such bearings have a longer service life.

Moreover, by providing two separate bearings, the entire length of the bearings is shorter than a conventional one-piece bearing. Such bearings can be press-fitted between the support shaft and the pulley arm. The bearing cost is fairly low, too.

Other features and objects of the present invention will become apparent from the following description taken with reference to the accompanying drawings, in which:

FIG. 1 shows the belt tension adjusting device of a first embodiment.

Figure 1:
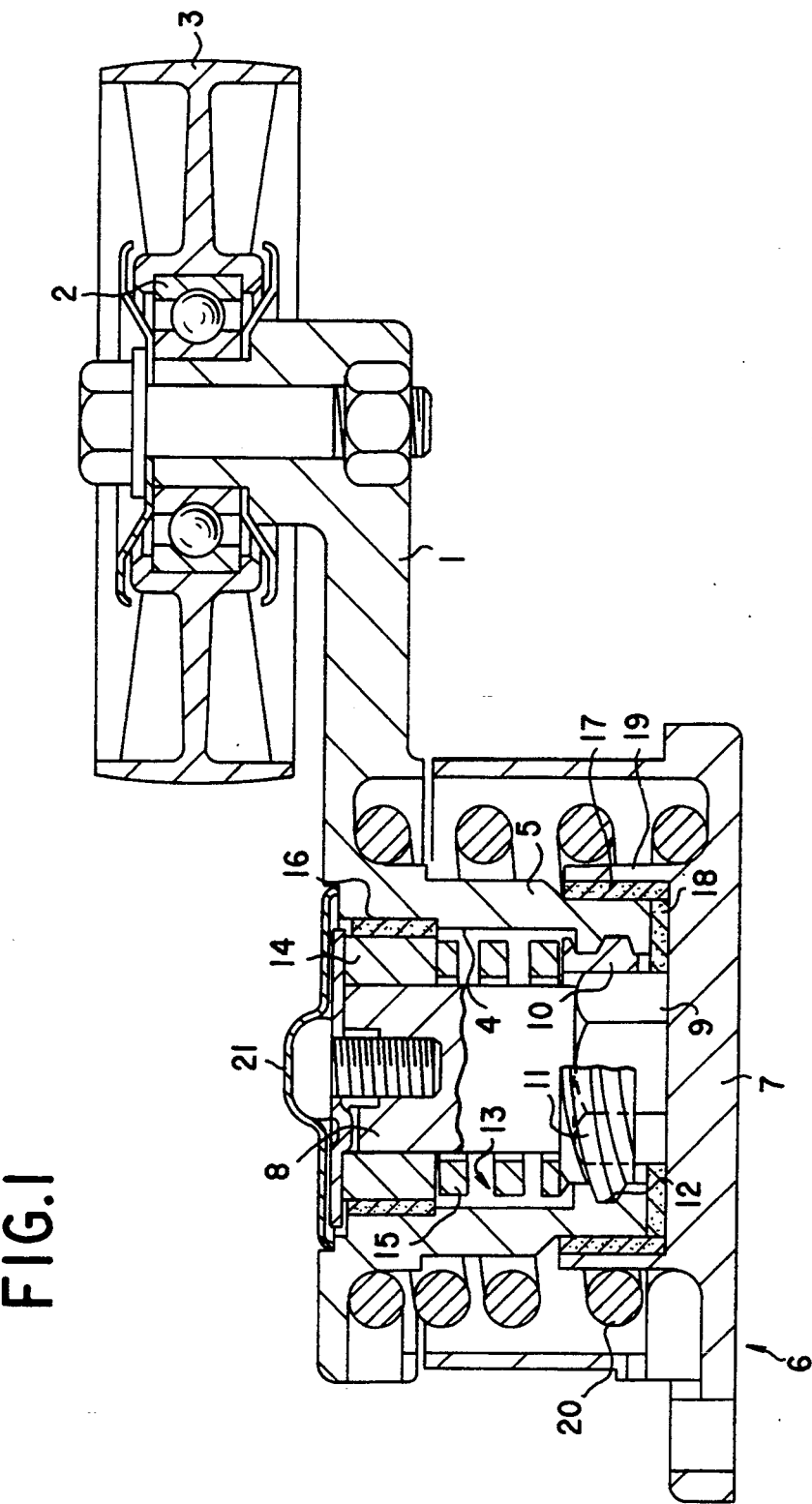
FIG. 1 is a front view partially in vertical section of a first embodiment.

As shown in the figure, a tension pulley 3 is rotatably mounted on one end of a pulley arm 1 through a bearing 2. The pulley arm is provided at the other end thereof (as a pivot center) with a boss 5 having a bore 4.

A fixed member 6 fixed to an engine block or the like comprises a base 7 and a support shaft 8 extending upright from the center of the base 7. The support shaft 8 is engaged in the bore 4 formed in the pulley arm 1.

The support shaft 8 has a base portion in the form of a polygonal spline 9. A damper bolt 10 is fitted onto the spline 9. The damper bolt 10 has a polygonal inner peripheral surface complementary in shape to the spline 9, so that the damper bolt 10 is movable axially along the support shaft 8 guided by the spline 9 but is not rotatable.

The damper bolt 10 is provided on the outer peripheral surface thereof with multiple threads 11 having a large helix angle, the threads 11 being in threaded engagement with threads 12 formed on the bore 4 of the pulley arm 1.

A collar member 14 is press-fitted into the upper part of the support shaft 8. A coil spring 15 is mounted between the collar member 14 and the damper bolt in a compressed state, so that the damper bolt 10 is biassed axially (downward in FIG. 1) by the force of the spring 15. In the structure of this embodiment, a damper mechanism 15 is made up of the spline 9, bolt 10, coil spring 15, etc.

A bearing member 16 in the form of a radial bearing is mounted between the collar member 14 fitted on the upper end of the support shaft 8 and the peripheral surface of the bore 4 of the pulley arm 1.

The fixed member 6 has an annular wall 19 that extends vertically from the top surface of the base 7 along the boss 5 of the pulley arm 1. A bearing member 17 in the form of a radial bearing is mounted between the annular wall 19 and the boss 5.

On the other hand, a bearing member 18 in the form of a thrust bearing is mounted between the lower end of the boss 5 and the top surface of the base 7. These bearing members 16, 17 and 18 are made of a slide bearing material, e.g. a heat-resistant and wear-resistant synthetic resin such as polyetherether ketone (PEEK) or polyimide (PI).

Outside the boss 5 and the annular wall 19 is provided a tension adjusting spring 20 in the form of a coil spring. The spring 20 has one end thereof secured to the pulley arm 1 and the other end thereof to the base 7 of the fixed member 6.

In the figure, numeral 21 indicates a cover for the opening of the bore. It prevents dust and debris from entering into the radial bearing portions.

Now we shall describe the operation of the belt tension adjusting device of this embodiment. The fixed member 6 is fixed to an engine block or the like. The tension pulley 3 is pressed against the belt and the pulley arm 1 is turned by a predetermined angle. In this state, the tension adjusting spring 20 is compressed and distorted, so that it tends to return to its original position. By this restoring force of the spring 20, a predetermined tensile force is exerted on the belt.

If, in this balanced state, the tension of the belt increases and the pulley arm 1 pivots, the damper bolt 10 will move upwards, compressing the coil spring 15. As a result, the biasing force of the coil spring 15 increases, thus increasing the frictional resistance between the thread surfaces on the damper bolt 10 and the boss 5. This offers a greater resistance to the pivoting motion of the pulley arm 1.

In contrast, if the tension of the belt begins to decrease from the balanced state, the pulley arm 1 will pivot in the opposite direction, so that the damper bolt 10 will move down, allowing the coil spring 15 to expand. Thus, the biasing force of the coil spring 15 now acts on the damper bolt 10 in such a direction as to help the pulley arm 1 to pivot, so that the pulley arm 1 can pivot without encountering a large resistance.

As the pulley arm 1 pivots, the bearing members 16, 17 in the form of radial bearings are subjected to bending moment resulting from the tension of the belt which acts on the pulley, due to the difference in heights between the mounting positions of the bearing members 16, 17 and the tension pulley 3. Most of the radial load resulting from the bending moment acts on both ends of the support shaft 8 and is borne by the outer ends of the bearing members 16 and 17. Thus, they can bear substantially the same radial load as can a radial bearing extending the entire length of the support shaft in the prior art structure. As a result, the rigidity of the device is kept high.

Figure 5:
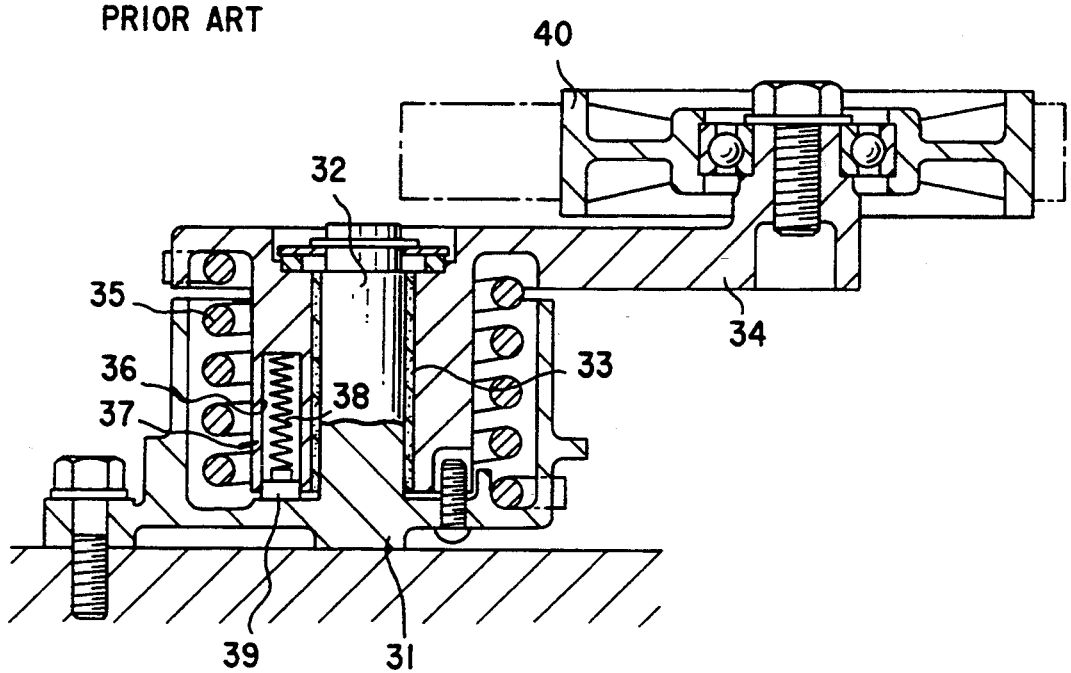
FIG. 5 is a sectional view of the prior art.

Also, with this structure, the lower bearing member 17 for bearing the radial load is provided outside the portion of the pulley arm 1 where the bore 4 is formed so as to overlap longitudinally the support shaft 8. Thus, the device of this embodiment is shorter in height than the conventional device shown in FIG. 5 by the amount equal to the length of the bearing member 17, without reducing the entire length of the bearing portions (and thus the capacity to bear radial loads).

Figure 2:
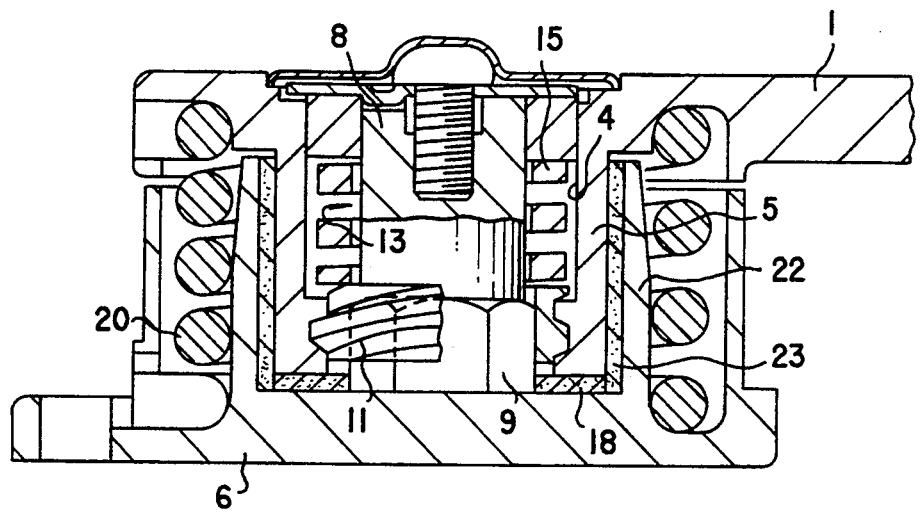
FIG. 2 is a similar view of a second embodiment.

FIG. 2 shows a second embodiment in which an annular wall 22 is provided to extend vertically from the top surface of the base of the fixed member 6 to a point near the upper end of the support shaft 8. A bearing member is mounted between the annular wall 22 and the boss 5 of the pulley arm 1. The bearing member 16 provided between the upper end of the support shaft and the bore in the embodiment shown in FIG. 1 is not provided in this embodiment. Otherwise, this embodiment is the same as the first embodiment. Thus, like parts are denoted like numerals and their description is omitted.

In this embodiment, all the radial bearings are mounted on the outside of the portion of the pulley arm 1 where the bore 4 is formed, so that the device of this embodiment is still shorter in height than the first embodiment.

Figure 3:
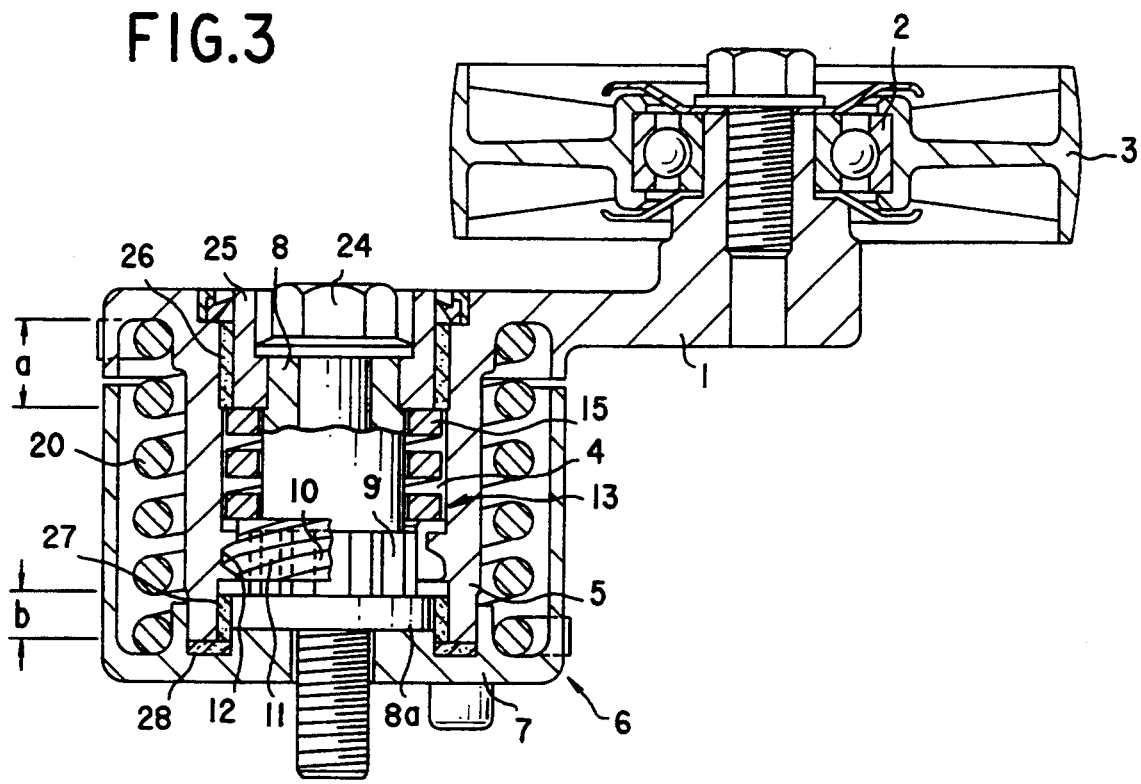
FIG. 3 is a similar view of a third embodiment.

FIG. 3 shows a third embodiment in which the fixed member 6 comprises the base 7 and the hollow support shaft 8 extending vertically from the center of the base 7. A tightening bolt 24 extends through the support shaft 8.

As shown in the figure, the fixed member 6 is fixed in position by engaging the support shaft 8 in the bore 4 of the pulley arm 1 and screwing the tightening bolt 24 through the support shaft 8 into an engine block or the like. With the fixed member 6 and the pulley arm 1 secured in position as described above, the tension pulley 5 is located higher than the support shaft 8 and overhangs the bearing members described hereinbelow.

Bearing members 26 and 27 in the form of radial bearings are mounted between upper and lower ends of the support shaft 8, that is, between a collar member 25 and the peripheral surface of the bore 4 and between the base end 8a of the support shaft 8 and the peripheral surface of the bore 4, respectively. Further, a bearing member 28 in the form of a thrust bearing is mounted between the lower end of the boss 5 of the pulley arm 1 and the top surface of the base 7.

The upper bearing member 26, i.e., the one located nearer to the pulley 3 has a length a larger than the length b of the lower bearing member 27 (a>b).

Otherwise, this embodiment is the same as the first embodiment. Thus, like parts are denoted like numerals and their description is omitted.

In this embodiment, when the pulley arm 1 pivots, the bearing members 26, 27 in the form of radial bearings are subjected to radial loads resulting from the tension of the belt that acts on the pulley 3, due to the difference in heights between the bearing members 26, 27 and the tension pulley 3. Most of the radial load resulting from the bending moment acts on both ends of the support shaft 8 and is borne by the outer ends of the bearing members 26 and 27.

In this case, since the pulley 3 overhangs the bearing members 28, 27, the bending moment acts to a greater extent on the upper bearing member 26 located nearer to the pulley mounting position than on the lower bearing member 27 remote from it. But, in this example, the bearing member 26 to be subjected to a greater load is longer than the bearing member 27, so that the bearing members 26 and 27 are subjected to substantially the same surface pressure. Thus, the bearing members 26, 27 wear substantially the same rate and have substantially the same life, so that they can bear loads in a balanced manner and are durable.

Figure 4:
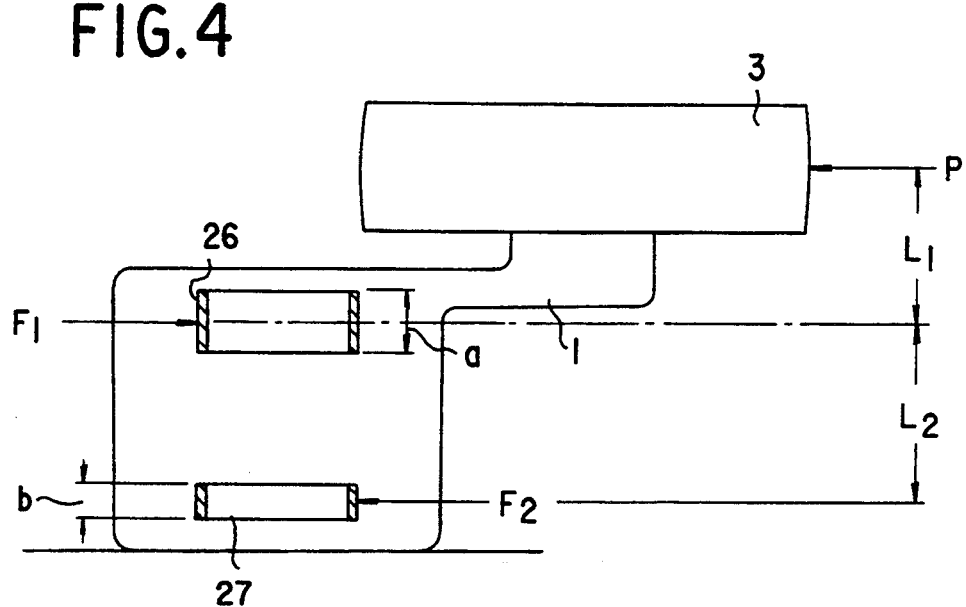
FIG. 4 is a view showing the balance of moment.

The lengths a, b necessary for equalizing the surface pressures on the bearing members 26, 27 can be calculated easily from the amount of overhang of the pulley 3 with respect to the bearing members 26, 27, Namely, as shown in FIG. 4, power P that acts on the pulley 3 from the belt, loads F1, F2 that act on the respective bearing members 27 and the amounts of overhang L1 and L2 of the pulley with respect to the bearing members 26, 27 satisfy the relation:

$$F1 \times L1 = F2 \times (L1 \times L2),$$

from which the following formula is obtained:

$$F2/F1 = L1/(L1+L2).$$

It is apparent from the above formulas that in order to equalize the surface pressures on the respective bearing members 26 and 27, the ratio between the lengths a and b of the bearing members 26, 27 has to be set to satisfy the relation a:b=(L1+L2):L2.

In the above embodiments, the damper mechanism 13 comprises the damper bolt 10, coil spring 15, etc. But it may be one that utilizes spring force or hydraulic power or may be of any other type as far as it can damp the pivoting motion of the pulley arm 1 in one direction.

What is claimed:

1. A belt tension adjusting device comprising a fixed member, a support shaft extending vertically from said fixed member, a pulley arm having a boss at one end thereof and a pulley mounted at the other end thereof, said boss being formed with a bore, said pulley arm pivotally mounted on said support shaft with said support shaft received in said bore, a damper mechanism mounted between said support shaft and said boss for damping the pivoting motion of said pulley arm, a tension adjusting spring coupled to said pulley arm for biasing said pulley to impart tension to a belt, and a bearing for bearing radial load produced when said pulley arm pivots, at least part of said bearing being located on the outer periphery of said boss of said pulley arm.

2. A belt tension adjusting device comprising a fixed member, a support shaft extending vertically from said fixed member, a pulley arm having a boss at one end thereof and a pulley mounted at the other end thereof, said boss being formed with a bore, said pulley arm pivotally mounted on said support shaft with said support shaft received in said bore, a damper mechanism mounted between said support shaft and said boss for damping the pivoting motion of said pulley arm, a tension adjusting spring coupled to said pulley arm for biasing said pulley to impart tension to a belt, a pair of bearings provided independently of each other at both ends of said support shaft, said damper mechanism being provided between said bearings, one of said bearings which is located nearer to a point at which said pulley is mounted on said pulley arm having a length larger than the length of the other of said bearings.

* * * * *